(12) United States Patent
Dimov

(10) Patent No.: US 11,815,681 B2
(45) Date of Patent: Nov. 14, 2023

(54) ELIMINATING GLARE IN HEAD-UP DISPLAYS

(71) Applicant: LUMINIT LLC, Torrance, CA (US)

(72) Inventor: Fedor Dimov, Torrance, CA (US)

(73) Assignee: LUMINIT LLC, Torrance, CA (US)

(*) Notice: Subject to any disclaimer, the term of this patent is extended or adjusted under 35 U.S.C. 154(b) by 389 days.

(21) Appl. No.: 17/080,929

(22) Filed: Oct. 27, 2020

(65) Prior Publication Data

US 2022/0128814 A1 Apr. 28, 2022

(51) Int. Cl.
| | | |
|---|---|---|
| *G02B 27/01* | (2006.01) | |
| *G02B 27/02* | (2006.01) | |
| *G03H 1/00* | (2006.01) | |
| *A61F 13/53* | (2006.01) | |
| *G02B 27/00* | (2006.01) | |
| *G02B 1/11* | (2015.01) | |
| *G02B 5/32* | (2006.01) | |

(52) U.S. Cl.
CPC ............ *G02B 27/0103* (2013.01); *G02B 1/11* (2013.01); *G02B 5/32* (2013.01)

(58) Field of Classification Search
CPC .... G03H 2001/43; G03H 1/00; G03H 1/0005; G03H 1/024; G03H 1/2249; A61F 13/53; G02B 27/0093; G02B 2027/014; G02B 5/18; G02B 27/0103; G02B 27/02; G02B 27/01; G02B 27/0101; G02B 27/0149; G02B 27/1006; G02B 27/14
USPC ... 359/630–634, 13–14, 1, 462, 636, 15, 24, 359/28, 34; 348/115; 345/7, 9, 156
See application file for complete search history.

(56) References Cited

U.S. PATENT DOCUMENTS

| | | |
|---|---|---|
| 5,859,714 A | 1/1999 | Nakazawa |
| 7,123,418 B2 | 10/2006 | Weber et al. |
| 9,285,588 B2 | 3/2016 | Shikii |

(Continued)

FOREIGN PATENT DOCUMENTS

JP 2000233665 A 8/2000

OTHER PUBLICATIONS

Automobile Windshield, Made How, vol. 1, http://www.madehow.com/Volume-1/Automobile-Windshield.html#ixzz6lUWfdqfa.
(Continued)

*Primary Examiner* — Dawayne Pinkney
(74) *Attorney, Agent, or Firm* — PATENT LAW WORKS LLP

(57) ABSTRACT

Systems and methods for reducing glare from a heads-up display (HUD). Internal and external antireflective coatings may be provided on interior and outer surfaces of glass layers surrounding a holographic polymer layer. A substrate guided hologram may be integrated into a HUD to diffract and direct external radiation to the edge of a HUD. An arrangement for forming a substrate guided hologram includes an array of reflectors and a shaped glass block. Antireflective coated glass layers may be index-matched to opposite sides of a holographic polymer film prior to recording a reflection hologram. An inactive playback beam may be used to monitor the diffraction efficiency of a reflection hologram and of a spurious transmission hologram with the recording of the reflection hologram to maximize the difference between the diffraction efficiencies of useful reflection hologram and spurious transmission hologram.

10 Claims, 11 Drawing Sheets

(56) References Cited

U.S. PATENT DOCUMENTS

2010/0157400 A1* 6/2010 Dimov .............. G02B 27/0172
359/13
2012/0013962 A1* 1/2012 Subbaraman ........ G02B 6/1225
359/15
2020/0333593 A1 10/2020 Bard

OTHER PUBLICATIONS

Blanche, Holigraphic Combiners Improve Head-Up Displays, Photonics Media, Photonics.com, https://www.photonics.com/Articles/Holographic_Combiners_Improve_Head-Up_Displays/a64487.
Bruder Friedrich-Karl, et al., Mass Production of Volume Holographic Optical Elements (vHOEs) Using BayfolHX Photopolymer Film in a Roll-to-Roll Copy Process, Proceedings of SPIE, SPIE, US, vol. 10127, Mar. 2, 2017.
EP Application No. 21204610.6 European Search Report dated Mar. 30, 2022, 13 pages.

* cited by examiner

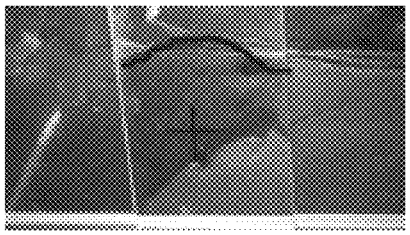

Time 0. Extended irregular area outlined in blue is the top edge of a puddle of index fluid matching the AR glass to the hologram near the + sign on the slide.

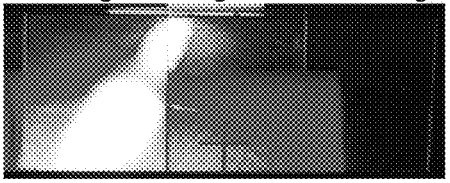

Time 0.22s. The white light is very bright and shown to the left of the slide and is moving toward the right of the slide.

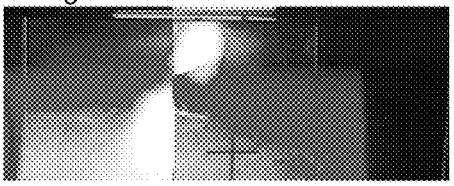

Time 0.37s. The white light is shown to have moved to the edge of the slide and already some of it can be seen to be blocked by the AR glass matching the hologram.

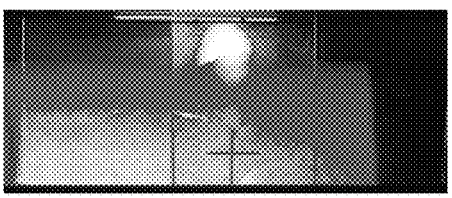

Time 0.44s. The white light is shown to have moved to the center of the slide and is completely blocked by the AR glass matching the hologram.

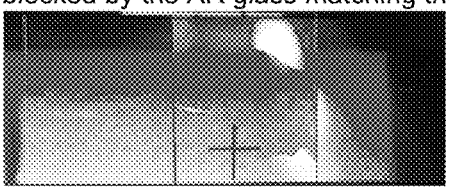

Time 0.67s. The white light is shown to have moved to the opposite edge of the slide with most of it still blocked by the AR glass matching the hologram but some being visible outside the region of the AR glass matching the hologram on the far right of the slide.

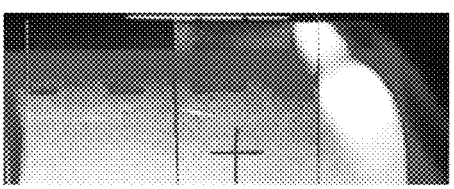

Time 0.81s. The white light has moved off the slide to the far right and is not blocked and very bright.

Fig. 2B

ELIMINATING GLARE IN HEAD-UP DISPLAYS

BACKGROUND

Head-Up Displays (HUDs) offer the ability to provide operators of vehicles, such as automobiles or aircraft, enhanced experiences during vehicle operation. For example, such displays may enable the provision of guidance information without the need for the operator to move their visual focus from the path ahead of the vehicle to a nearby discrete guidance unit, like a mobile phone running a map program. Vehicle status information may also be integrated into the HUD data, including vehicle speed, fuel status, and obstacle detection.

Modern HUDs with integrated thin-film holograms can either be standalone or integrated into a vehicle windshield. Both afford a degree of flexibility in terms of orienting the projector beam to diffract an acceptable virtual image to the eyes of an operator. Moreover, an HUD based on holography can occupy a smaller volume in the vehicle compared to a HUD based upon refractive/reflective glass optics.

However, current HUD systems can be problematic. The virtual image created using the hologram is based upon the diffraction of light and external broadband illumination, such as sunlight, can form glare through a variety of interactions with the hologram and surrounding structures. For example, a spurious transmission hologram may be inadvertently recorded during the recording of the desired reflection hologram due to Fresnel reflection of the bright laser recording beams from the flat sides of the hologram substrate. In addition, sunlight shining on the HUD at a certain angle during playback may be reflected at Bragg angle by a glass layer forming the windshield, thereby retrieving the spurious bright, dispersed beam into the eyes of the operator. Such glare can obscure the projected images provided by the HUD and may distract or partially blind the vehicle operator while the vehicle is in operation, which is unsafe.

Therefore, it would be desirable to have HUD configurations that are immune to the effects of external radiation and the resulting glare generated thereby.

BRIEF SUMMARY

The present disclosure describes systems and methods for eliminating glare in HUDs. Such glare may be caused by diffraction at playback from a spurious transmission hologram formed during the recording of a desired reflection hologram and/or caused by Fresnel reflection at playback from an internal substrate adjacent the reflection hologram. Further, in the system, the HUD may be a standalone HUD.

One embodiment is directed to a system for reducing glare in a heads-up display (HUD) comprising a distal glass layer; a proximal glass layer; a holographic polymer layer comprising a reflection hologram that is adjacent to the distal glass layer and proximal glass layer; and an external antireflective coating covering an exterior surface of the distal glass layer and the proximal glass layer; wherein radiation from an external light source can diffract on the reflection hologram and pass out of the system without internal reflection off the exterior surface of the distal glass layer; and wherein the radiation from an external light source that does not diffract can pass through an interior surface of the proximal glass layer without Fresnel reflection back onto the reflection hologram thereby eliminating glare.

In this embodiment, the external antireflective covering comprises one or more additional layers comprising glass, thin film, coating, or mixtures thereof that provide low light reflection.

In yet another embodiment, the external antireflective covering comprises one or more additional layers of glass that provide low light reflection and wherein the antireflective layer of glass is index matched to the distal and/or proximal glass layer adjacent to the hologram.

In still another embodiment, the external antireflective covering comprises one or more additional layers of a coating that provide low light reflection.

Another embodiment is directed to a system for reducing glare from a head-up display (HUD), comprising a distal glass layer; a proximal glass layer; a holographic polymer layer comprising a reflection hologram that is adjacent to the proximal glass layer; and at least one compound substrate-guided hologram (SGH) that is adjacent to the reflection hologram and adjacent to the distal glass layer, wherein radiation from an external light source could impinge upon a rearward surface of the reflection hologram, but through use of the SGH, is guided out to edge(s) of the hologram through total internal reflection (TIR) so that an image is not obscured by glare.

In another embodiment, the at least one compound SGH is comprised of a linear array of multiple, adjacent SGH segments.

Moreover, each of the multiple, adjacent SGH segments in the linear array is adjacent to the distal glass layer and is capable of accepting light from an external light source at a first location within the respective SGH segment and capable of transmitting the light into the distal glass layer by total internal reflection to a second location within the linear array without being diffracted.

In still another embodiment, the distal glass layer acts as a transparent substrate along the length of a respective SGH segment.

Also, each SGH segment is configured to accept light from at least one of the external light sources and to transmit the accepted light at a respective guided angle within distal glass layer.

In yet another embodiment, the respective guided angle of the each SGH segment differs by the same value from the respective guided angle of the adjacent SGH segment or segments and is less than the guided angle of the adjacent SGH segment in the first direction.

In this embodiment, the minimum guided angle of the adjacent SGH segments is 12°; and wherein the maximum guided angle of the adjacent SGH segments is 48°.

In still another embodiment, the length of each SGH segment is greater than the length of an adjacent SGH segment in the first direction.

In addition, the guided angle of each SGH segment of each SGH segment differs from the guided angles of the remaining SGH segments.

In yet another embodiment, the light after bouncing once in the distal glass layer will not be in Bragg with the adjacent SGH segment.

Also, the linear array of multiple, adjacent SGH segments is oriented as plural, vertically adjacent, laterally oriented SGH segments.

In addition, the multiple, adjacent SGH segments are multiplexed.

Another embodiment is directed to a system for recording a compound substrate-guided hologram (SGH) in a holographic film, the compound SGH comprised of an array of plural, adjacent SGH segments, each of the plural, adjacent SGH segments in the array capable of accepting light of a respective wavelength range from an external light source and of transmitting the accepted light within an elongate transparent substrate capable of accepting the light transmitted by the SGH at a first location and directing the light along a length of the substrate in a first direction by total internal reflection to a second location spaced from the first location, the second location being either at a boundary between the SGH segment having the first location and the next adjacent SGH segment in the first direction or within the next adjacent SGH segment in the first direction, each SGH segment being configured to transmit the accepted light at a respective guided angle within the transparent substrate in the first direction, and the respective guided angle of the holographic lens of each SGH segment differing from the respective guided angle of the adjacent SGH segment or segments, the system comprising the holographic film having first and second sides; an array of reflectors; first and second light beam sources each for selectively generating a collimated light beam, the first and second beams being parallel and coherent, the first beam impinging on the first side of the holographic film and the second beam impinging upon the array of reflectors; and a shaped glass block adjacent the second side of the holographic film opposite the first side, wherein for each SGH segment of the compound SGH to be recorded in the holographic film there is a respective reflector in the array of reflectors for reflecting a portion of the second beam onto the second side of the holographic film coincident with the respective SGH segment, and wherein the shaped glass block guides, for each SGH segment of the compound SGH to be recorded in the holographic film, the reflected portion of the second beam from the respective reflector of the array of reflectors onto the second side of the holographic film coincident with the respective SGH segment, and wherein the angle of each reflector of the array of reflectors, relative to the direction of the second beam, differs from the angle of each other reflector of the array of reflectors relative to the direction of the second beam.

Another embodiment is directed to a system for preventing the formation of Fresnel reflections during reflection hologram formation, the system comprising a holographic polymer film having opposite first and second planar sides; a first glass layer, index matched to the holographic polymer film, disposed against the first side of the holographic polymer film; a first thin glass outside with antireflective coating index matched with not antireflective coated side to the first glass layer; a second glass layer, index matched to the holographic polymer film, disposed against the second side of the holographic polymer film; a second thin glass layer outside with antireflective coating index matched with not antireflective coated side to second glass layer; a first recording beam source configured to selectively project a first recording beam through the first thin glass layer with antireflective coating and first glass layer onto the first side of the holographic polymer film; and a second recording beam source coherent with the first recording beam source configured to selectively project a second recording beam through the second thin glass layer with antireflective coating and second glass layer onto the second side of the holographic polymer film; whereby each of the first and second antireflective coatings prevents Fresnel reflections of the respective first or second beam from the outer sides of first and second glass layers onto the holographic polymer film, thereby preventing the recording of spurious transmission holograms during reflection hologram formation.

Another embodiment is directed to a system for minimizing the formation of a spurious transmission hologram during the recording of a reflection hologram, comprising a holographic polymer film having first and second sides; a first recording beam directed on the first side of the holographic polymer film; a second recording beam, coherent with the first recording beam, directed on the second side of the holographic polymer film; a playback beam directed on the first side of the holographic polymer film, the playback beam having a wavelength that is different from that of each of first and second recording beams and that is inactive with respect to the holographic polymer film; a first detector on the first side of the holographic polymer film for detecting the optical power of the diffraction at Bragg angle of the playback beam from a portion of the reflection hologram as the reflection hologram is being recorded; and a second detector on the second side of the holographic polymer film for detecting the optical power of the diffraction at Bragg angle of the playback beam from the spurious transmission hologram as the reflection hologram is being recorded.

Another embodiment is directed to a method of recording a compound substrate guided hologram (SGH) in a holographic film, the compound SGH comprised of an array of plural, adjacent SGH segments, the method comprising (a) providing the holographic film having first and second sides; (b) providing an array of reflectors; (c) providing first and second mutually coherent light beam sources each for selectively generating a collimated light beam, the first and second beams being parallel, the first beam impinging on the first side of the holographic film and the second beam impinging upon the array of reflectors; (d) disposing a shaped glass block adjacent the second side of the holographic film opposite the first side; and (e) illuminating the first side of the holographic film with the first beam while illuminating the array of reflectors with the second beam, thereby illuminating the second side of the holographic film via the shaped glass block.

Another embodiment is directed to a method of minimizing the formation of a spurious transmission hologram during the recording of a reflection hologram, comprising directing a first recording beam onto a first side of a holographic polymer film; directing a second recording beam coherent with the first recording beam onto a second side of the holographic polymer film; directing a playback beam onto the holographic polymer film at Bragg angle, the playback beam being of a wavelength that is different from that of the first and second recording beams and that is inactive with respect to the holographic polymer film; detecting the optical power of the diffraction of the playback beam from a portion of the reflection hologram recorded on the holographic polymer film with a first detector as the reflection hologram is being recorded; and detecting the optical power of the diffraction of the playback beam from a portion of the spurious transmission hologram recorded on the holographic polymer film with a second detector as the reflection hologram is being recorded.

BRIEF DESCRIPTION OF THE DRAWINGS

FIG. 2B is a series of time lapse photos of a light source being passed from one end to the opposite end of a glass slide containing an AR coating that is index matched to a hologram demonstrating antiglare effect on the HUD virtual red image.

DETAILED DESCRIPTION OF EXEMPLARY EMBODIMENTS

Disclosed are approaches for preventing the formation of glare in reflection holograms, such as those used in Head-Up Displays (HUDs) for vehicular applications. Reflection holograms may be susceptible to glare generation in the presence of strong external illumination, such as from sunlight, in the absence of the presently disclosed approaches. These may be practiced individually or in combination. Certain of these approaches are useful after a reflection hologram has been recorded. Others are useful during the reflection hologram recording process.

Figure 1A:
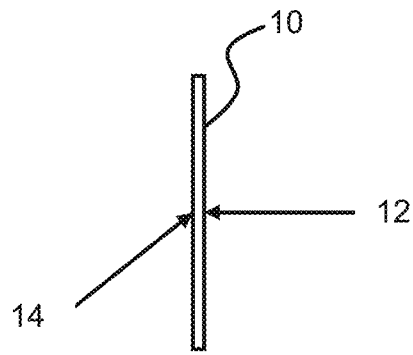
FIG. 1A is a side view of the recording process for a reflection hologram according to the prior art.

FIG. 1A demonstrates a typical recording geometry employed in recording a reflection hologram in a holographic substrate 10. A reference beam 14 and an object beam 12 illuminate opposite sides of the holographic substrate during recording. The beams are mutually coherent spherical beams with certain angular divergence determined by the HUD field of view. A viewer will view the resulting hologram from the same side as the reference beam. The holographic substrate may be, for example, a photopolymer disposed upon a glass substrate before recording, and the photopolymer may be removed from the glass substrate prior to being used in particular applications, such as being sandwiched between glass layers for use in a vehicle windshield.

The hologram may be used within different forms of HUDs. In some applications, the HUD is mounted within a frame or other support structure and is sandwiched between transparent substrates, such as sheets of glass. Such a structure is referred to as a free-standing HUD. In other applications, the HUD is integrated into a vehicle windshield, such as that of a car, truck, aircraft, etc.

Figure 1B:
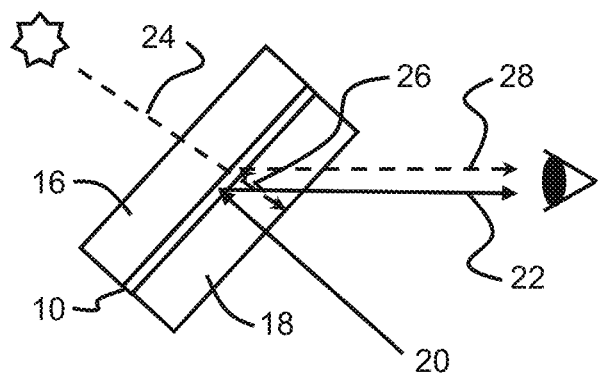
FIG. 1B is a side view of a prior art reflection hologram, such as formed according to FIG. 1A, between two glass substrates with sunlight passing therethrough, reflecting off a proximal glass substrate, then diffracting off the reflection hologram as glare.

In FIG. 1B, the recorded reflection hologram of FIG. 1A is disposed within proximal and distal glass layers 18, 16, proximal being defined herein as being closer to a viewer when in use. In vehicular applications, at least a portion of strong sunlight illumination 24 may pass through the distal glass layer 16, pass through the reflection hologram 10, reflect off an interior side of the proximal glass layer 18 as Fresnel reflection 26, and diffract off the reflection hologram 10 at Bragg angle towards the viewer as glare 28. This glare 28 can obscure the desired reflected image 22 generated by the projected image 20.

Figure 2A:
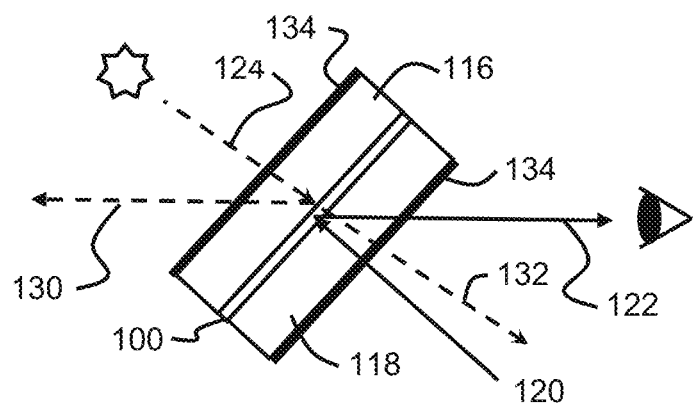
FIG. 2A is a side view of a reflection hologram with antireflective coatings on outer surfaces of the glass substrates for inhibiting the glare of FIG. 1B, according to an embodiment of the present disclosure.

One approach to eliminating such glare 28 with respect to a prerecorded reflection hologram 100 is shown in FIG. 2A. Here, antireflective layers 134 are disposed on exterior surfaces of the proximal and distal glass layers 118, 116 that surround the hologram 100. The antireflective layers 134 may be additional layers of glass, thin film, coating, or mixtures thereof that provide low light reflection.

In practice, a portion of strong external illumination, such as sunlight 124, may diffract on the hologram 100 and pass out of the optical system without internal reflection 130 off the exterior surface of the distal glass layer 116 due to the presence of the antireflective layer 134 on the distal glass layer 116. The desired reflected image 122 generated by the projected image 120 is not obscure by glare.

Similarly, a non-diffracted portion the sunlight 124 may pass through the hologram 100, such as illustrated in FIG. 1B, and then passes through the exterior surface of the proximal glass layer 118 without Fresnel reflection 132 back onto the hologram, thus eliminating the glare 28 of FIG. 1B.

The antireflective layers 134 may be the same on both the proximal and distal glass layers 118, 116. Alternatively, each such antireflective layer may be customized, depending upon its location and operating environment. Further, the disclosed approach may also employ a single instance of antireflective layer on the exterior surface of the proximal glass layer 118.

FIG. 2B is a series of time lapse photos demonstrating the antiglare effect on a HUD virtual red image. The system here is similar to that shown in FIG. 2A, having a distal glass layer; a proximal glass layer; a holographic polymer layer comprising a reflection hologram that is adjacent to the distal glass layer and proximal glass layer, and an external antireflective coating covering an exterior surface of the distal glass layer and the proximal glass layer. In this embodiment, radiation from an external light source can diffract on the reflection hologram and pass out of the system without internal reflection off the exterior surface of the distal glass layer. Also, the radiation from an external light source that does not diffract can pass through an interior surface of the proximal glass layer without Fresnel reflection back onto the reflection hologram thereby eliminating glare.

In some instances, the external antireflective covering comprises one or more additional layers comprising glass, thin film, coating, or mixtures thereof that provide low light reflection.

In one embodiment, the external antireflective covering comprises one or more additional layers of glass that provide low light reflection and wherein the antireflective layer of glass is index matched to the distal and/or proximal glass layer adjacent to the hologram.

In another embodiment, the external antireflective covering comprises one or more additional layers of a coating that provide low light reflection.

FIG. 2B illustrates a light source being passed from one end to the opposite end of a glass slide containing a hologram area in the center that is covered with index matched AR coated glass. This simulates the sun or street lamps illuminating the HUD at different angles from outside surface. The first slide shows an extended irregular area outlined in blue, which is the top edge of a puddle of index fluid matching the AR glass to the hologram located near the "+" sign on the slide. The second slide is Time 0.22 s. The white light source is shown to the left of the slide and is going to be moving over time toward the right of the slide, as illustrated in the next slides. The third slide is Time 0.37 s. The white light is shown to have moved to the left edge of the slide and already some of the light is shown to be blocked by the AR glass matching the hologram. The fourth slide is Time 0.44 s. The white light is shown to have moved to the center of the slide and the AR glass matching the hologram completely block this light. The fifth slide is Time 0.67 s. The white light is shown to have moved to the opposite edge of the slide, the right edge, with most of the light still blocked by the AR glass matching the hologram. Outside the region of the AR glass matching the hologram on the far right of the slide, the light is again visible. The sixth slide is Time 0.81 s. The white light has moved off the slide to the far right, is not blocked, and is visibly very bright. These photos demonstrate that the hologram area covered with the AR coated glass that is well index matched effectively blocks light from passing through the glass and thereby eliminates glare.

The approach to glare elimination described above with respect to FIG. 2A and FIG. 2B require the use of an antireflective layer on the outside and inside of a windshield or other glass surface. In another embodiment, only a single antireflective layer 134 on the exterior surface of the proximal glass layer 118 is employed.

Figure 3A:
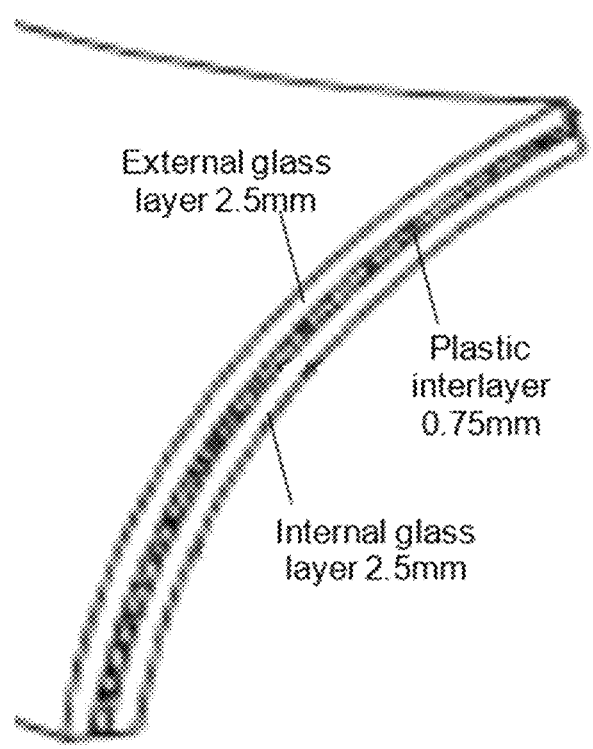
FIG. 3A is a drawing of a composite windshield structure demonstrating layers thicknesses

FIG. 3A is a drawing of one embodiment of a glass windshield that involves two layers of 2.5 mm thick glass with plastic interlayer between of thickness 0.75 mm. The plastic layer includes a ~75-micron thick HUD reflection hologram structure and a substrate-guided hologram (SGH) of similar thickness to eliminate the glare.

Figure 3B:
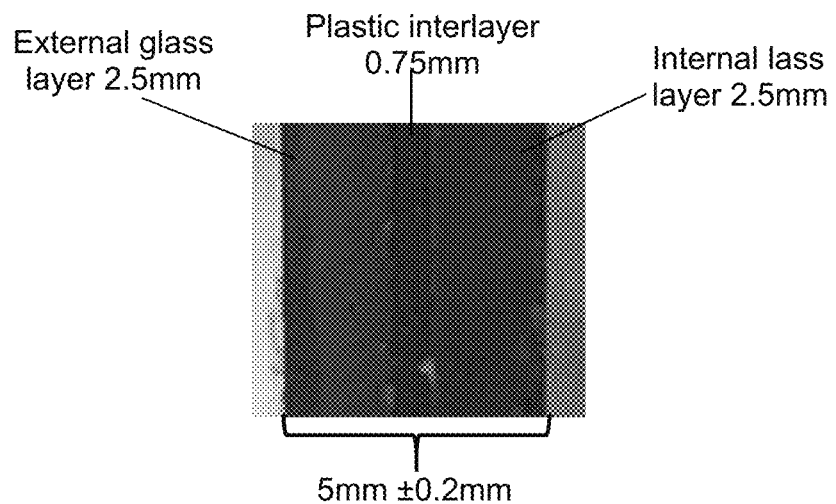
FIG. 3B is a photo of the edge of the windshield.

FIG. 3B is a photo of the edge of the windshield of FIG. 3A.

Figure 3C:
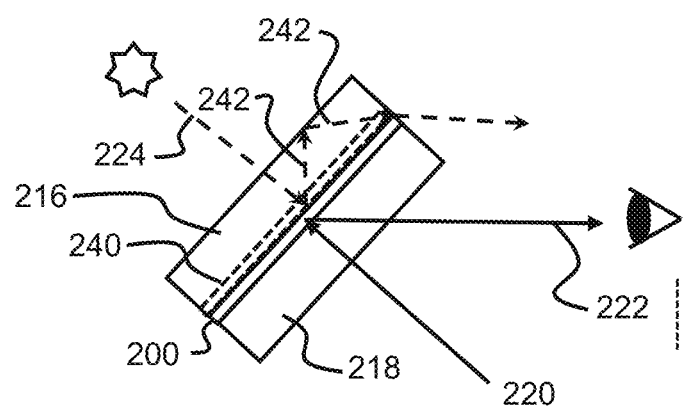
FIG. 3C is a side view of a reflection hologram with a substrate-guided hologram adjacent the reflection hologram and a distal glass substrate for inhibiting the glare of FIG. 1B.

In FIG. 3C, a reflection hologram 200 is adjacent to a proximal glass layer 218. A substrate-guided hologram (SGH) 240 is disposed adjacent the hologram 200 and the distal glass layer 216. Collectively, the hologram and the glass layers may make up a portion of a vehicle windshield. Strong external illumination, such as sunlight 224, could impinge upon a rearward surface of the reflection hologram 200, but through use of the SGH, is guided 242 out to the edge(s) of the hologram through total internal reflection (TIR). The desired reflected image 222 generated by the projected image 220 is apparent to a user and is not obscured by glare.

The size of the SGH depends upon the substrate thickness. Experimental results obtained by the present inventors indicate the thickness of the substrate to which the SGH is laminated is approximately ⅙ of the SGH size in the Bragg degeneration direction. For example, this means that for an SGH of 6" in the degeneration direction, the substrate would need to be about 1" thick.

A typical windshield with integrated hologram includes two glass layers on either side of a plastic interlayer. A typical value for the thickness of each glass layer is 0.098" (2.5 mm), whereas a typical value for the thickness of the plastic interlayer is 0.03" (0.75 mm). A HUD hologram is approximately 25 μm thick and a substrate is approximately 50 μm thick. This leaves sufficient room in the plastic interlayer and for an SGH structure of similar 75 μm thickness.

One segment of an SGH can only direct impinging light so far. A solution to this limitation is to include multiple adjacent SGH segments, an arrangement that may be referred to as a compound SGH. With such an arrangement, external radiation such as sunlight may be directed to the edge of the hologram through repeated instances of total internal reflection.

Figure 4A:
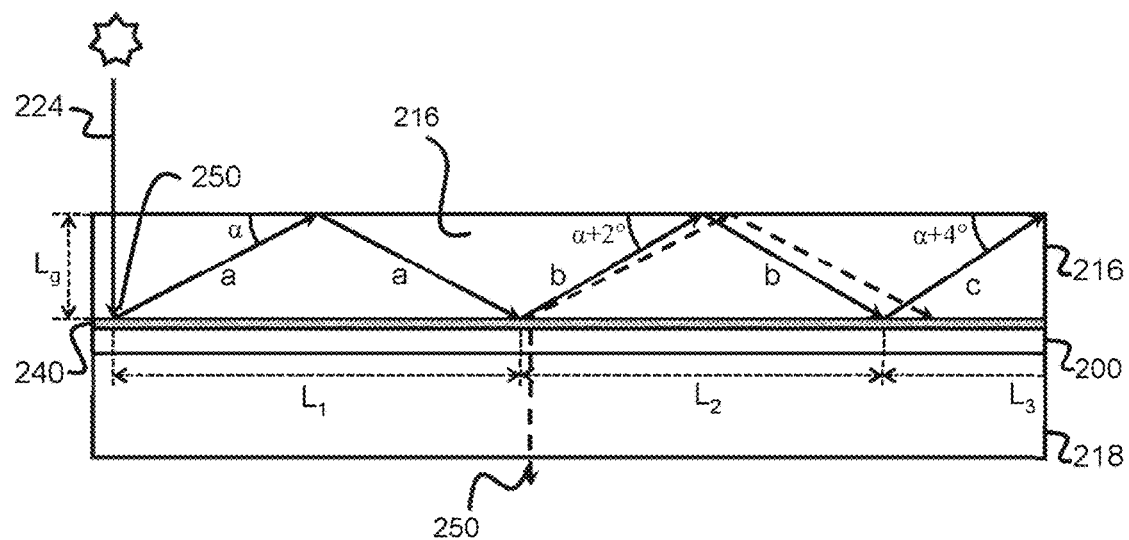
FIG. 4A is detailed side view of the reflection hologram with multiple adjacent substrate-guided holograms.

FIG. 4A depicts a portion of a hologram 200 adjacent opposing glass layers 218, 216. An SGH layer 240 is disposed on the exterior face of the hologram 200. Each segment within the SGH layer provides a holographic lens capable of accepting light from an external light source, such as sunlight, and transmitting the accepted light into an elongate transparent substrate. Sunlight 224 that impinges upon a portion of a first SGH segment having a length L1 is directed through the distal glass layer 216 at a respective guided angle α. Thus, the distal glass layer 216 acts as the elongate transparent substrate into which the first SGH segment transmits light. As previously stated, the size or length of an SGH segment depends upon the substrate thickness. Thus, a thin substrate limits the distance an SGH may direct accepted light by total internal reflection in the substrate. However, a set of adjacent SGH segments may be employed to enable multiple consecutive internal reflections to overcome this limitation in distance.

More specifically, FIG. 4A depicts a compound SGH having a first segment of length L1, a second segment of length L2, and a portion of a third segment of length L3. The depicted segments are mutually adjacent. If segment of length L2 were recorded with the same guided angle α as the segment of length L1, then the guided beam a, after bouncing one time in the 2.5 mm distal glass layer 216, would retrieve a copy of the initial sunlight beam 224 that retrieved the guided beam at a first location 250. Such a copied beam would be coupled out to the viewer's eyes. The undesired use of the same guided angle α in the segment of length L2 is shown in FIG. 4A as resulting in a continuation of a dashed line guided beam.

However, if the SGH segment of length L2 were recorded at a guided angle sufficiently different from that of the segment of length L1, then the guided beam a, after bouncing once within the 2.5 mm distal glass layer 216 as an elongate transparent substrate, will not be in Bragg with the SGH segment of length L2. Thus, the guided beam will continue as beam b. Segment of length L3 is recorded at a guided angle that is sufficiently different from that of segment L2 such that the guided beam will continue as beam c.

As shown in FIG. 4A, the difference in guided angle between SGH segments is 2°, such that the guided angle of the segment of length L1 is a, the guided angle of the segment of length L2 is α+2°, the guided angle of the segment of length L3 is α+4°, etc. No SGH segment thus retrieves the incoming sunlight as glare. The difference between successive guided angles may be different from 2°, depending upon the application geometry and requirements.

As depicted in FIG. 4A, L1>L2>L3. The length of each consecutive SGH segment can be calculated as in Eq. (1):

$$L_{n+1} = \frac{(2*2.5 \text{ mm})}{\tan(\alpha + 2n)} \quad (1)$$

Here, n=0, 1, 2, . . . 2.5 mm is the thickness of the distal layer of glass 216. The guided angle α+2n should be less than 48° because the total internal reflection (TIR) angle cannot be greater than 42° (guided angle equals 90°—TIR angle). It has been determined here through experimentation that to penetrate through the elongate transparent substrate without losses, the recorded guided angle should be greater than 12°. With a difference of 2° between the recorded angle of each consecutive SGH segment, Eq. (2) states:

$$12° + (2n)° = 48° \quad (2)$$

From Eq. (2), it can be determined that n=18.

Thus, the entire length of the compound SGH can consist of up to 18 segments, each of length $L_{n+1}$ and each being recorded with a guided angle α+2n. The total length of the compound SGH is calculated using Eq. (3):

$$\Sigma_1^n L = L_1 + L_2 + L_3 + \ldots + L_{18} = 23.5 \text{ mm} + 20 \text{ mm} + 17.4 \text{ mm} + 15.4 \text{ mm} + \ldots + 4.5 \text{ mm} = 271.7 \text{ mm} \approx 10.7'' \quad (3)$$

Figure 4B:
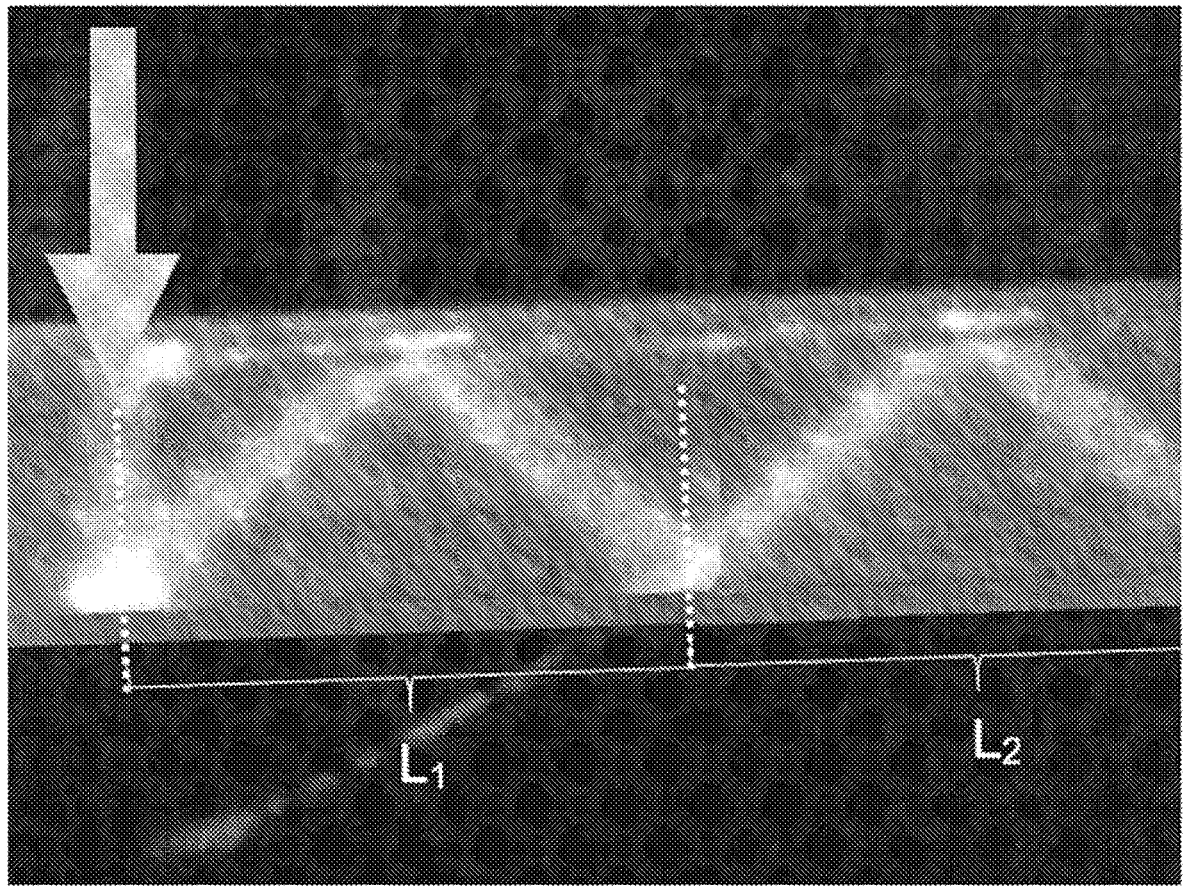
FIG. 4B is a photo of the of the arrangement of FIG. 4A showing light being passed from one substrate-guided hologram to the next to eliminate glare.

Thus, the maximum compound SGH size in the Bragg direction for this example is approximately 10.7". In a holographic HUD, the Bragg direction is typically substantially vertical. Thus, the multiple SGH segments in such a compound SGH are oriented as plural, vertically adjacent, laterally oriented SGH segments. This size hologram in a vehicular windshield is typically tilted 30° from horizontal towards the viewer. This converts to an approximately 9° vertical field of view (FOV) limited by the HUD hologram protected from glare by the compound SGH. Using HDMI resolution with ratio between horizontal FOV and vertical FOV of 16:9, such a HUD would have 17° horizontal FOV and 9° vertical FOV. Typically, the distance from the driver's eyes to the windshield is ~80 cm (~32"). Thus, the structure of FIG. 4 would be oriented at approximately 30° from horizontal, with the segment of length L1 being lower and towards the front of the vehicle, and the adjacent segment being progressively higher and closer to the vehicle operator. FIG. 4B is a photo of the arrangement described in FIG. 4A showing light being passed down the line of adjacent SGHs to eliminate glare.

However, such a compound SGH can eliminate glare for external light from only one narrow directional range and only at one narrow wavelength band. Considering angular selectivity within 2° and wavelength selectivity of ~20 nm for each compound SGH, it is desirable to multiplex plural compound SGH sets to eliminate glare in a cone angle of ~20°, and for half the visible spectrum of sunlight. The available plastic interlayer thickness of 0.75 mm between the glass layers allows the use of several tens of microns of the holographic layer to record the required number of multiplexed compound SGHs.

The total number of compound SGHs in one layer depends upon the hologram dimensions and windshield glass thickness. A typical HUD size is 8"×11", with the 8" dimension being coincident with the Bragg-degeneration direction. With a windshield glass layer thickness of 3.0 mm (as opposed to 2.5 mm as used in the example above), with an initial, smallest SGH segment guided angle of 12°, and with a difference in guided angle between successive SGH segments of 2°, 14 SGH segments may be employed. Collectively, they cover more than the 8" HUD dimension.

In an embodiment, three compound SGH holograms multiplexed within one 25.0 μm thick hologram having a refractive index change Δn=0.03 cover ~60 nm of the visible spectrum. Two such layers, put one on top of another, which are mutually adjacent and disposed on an exterior surface of the reflection hologram of the HUD, will cover half the visible spectrum. The geometry of each layer will be like that of FIG. 4 but the SGH will be recorded in each layer for the different wavelengths to expand the spectrum of the diffracted light.

Holographic polymer is available with a refractive index change of Δn=0.16. With such a polymer, it is possible to multiplex fifteen holograms. Alternatively, thickness may be reduced, thus reducing angular selectivity. For example, one 5.0 μm layer with Δn=0.16 incorporating three compound SGHs will cover 10° and ~60 nm of the visible spectrum. Further, four compound SGH layers of 5.0 μm thickness each will cover 20° and half the visible spectrum.

Four such layers laminated one on top of another and index matched thoroughly will not significantly affect the transmission of the windshield because there will be no additional Fresnel reflections. One layer has greater than 90% transmission; four SGH layers including one HUD hologram layer will have approximately 70% transmission.

Figure 5:
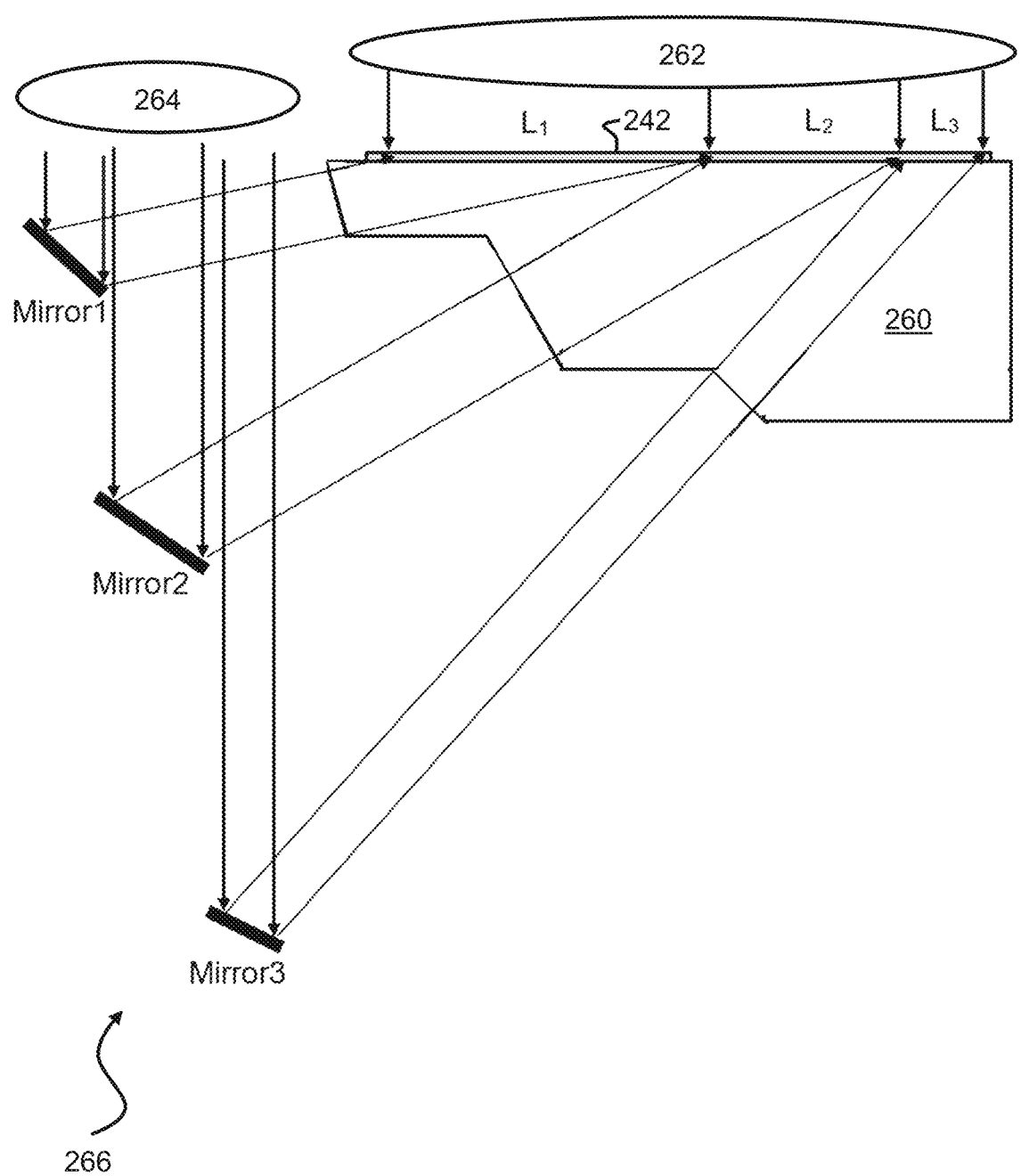
FIG. 5 is a side view of an apparatus for recording a substrate-guided hologram, such as for use in the embodiment of FIG. 4A.

In order to record a compound SGH having segments of unique guided angles, such as described above and with respect to FIG. 4A, an arrangement like FIG. 5 may be utilized. While three SGH segments of lengths L1, L2 and L3 are illustrated, the same principle may be extended to a compound SGH of many more segments, such as up to eighteen or more segments.

In FIG. 5, two sources 262, 264 of wide, collimated light beams are provided, the beams being parallel and shown directed in a downward, vertical orientation. The beam provided by a first source 262 is shown impinging upon the SGH substrate at a ninety-degree angle. Other desired angles may be employed in alternative embodiments.

A second source 264 impinges upon a number of mirrors in a mirror array 266, one mirror per SGH segment, each mirror being oriented relative to the direction of the second source beam to direct a portion of the second source beam at the desired angle to the respective SGH segment substrate. To further achieve the desired orientation of the beams reflected from the mirror array 266, a shaped glass block 260 is disposed adjacent the SGH substrate. Each reflected beam enters a respective portion of the glass block at a substantially orthogonal angle. The glass block enhances the ability of the mirror array to direct collimated beams onto the SGH substrate with the beam for each segment impinging at an angle that is a predetermined number of degrees different from that of each adjacent segment. As described above, the predetermined number of degrees of difference may be 2°. Also, as noted above, there may be up to 18 SGH segments if the difference in guided angle between consecutive segments is 2° for the glass layer and holographic substrate thicknesses as described above.

In an alternative embodiment, the second source 264 is replaced with the same number of discrete sources as there are mirrors in the mirror array 266. This embodiment requires careful orientation of each source to achieve parallel beams directed at the mirror array 266.

The use of a compound SGH has been described as having utility in inhibiting external illumination such as sunlight from propagating through a hologram and towards a viewer as glare. In addition, it is observed that the diffraction efficiency of a HUD hologram is less than 100%. Thus, a certain amount of projector light is not diffracted back to a viewer as the desired virtual image. Instead, some small portion may propagate through the hologram. The use of a compound SGH then prevents the small portion of projector light from reflecting off the exterior surface of the distal glass layer and contributing to glare experienced by the viewer since that small portion of projector light is coupled in the SGH, just as is the external light.

Figure 6A:
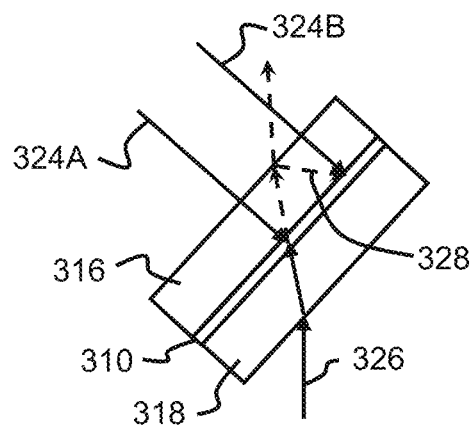
FIG. 6A is a side view of a prior art reflection hologram, such as formed according to FIG. 1B between glass substrates in which beams recording the reflection hologram also record a spurious transmission hologram.

Another source of glare encountered with HUDs results from a spurious transmission hologram inadvertently recorded simultaneously with the recording of a reflection HUD hologram. With reference to FIG. 6A, beams 324A, 326 recording the intended reflection hologram are shown. A holographic polymer layer 310 is sandwiched between distal and proximal glass layers 316, 318 that serves usually as hard stabilizing support during hologram recording for the fragile thin film holographic polymer layer 310. A non-negligible portion of beam 326 passes through the hologram substrate 310. A Fresnel reflection 328 of this portion returns to the holographic substrate from the exterior side of the distal glass substrate 316. The recording beam 324B and this reflection 328 record a transmission hologram within the holographic polymer layer 310.

Figure 6B:
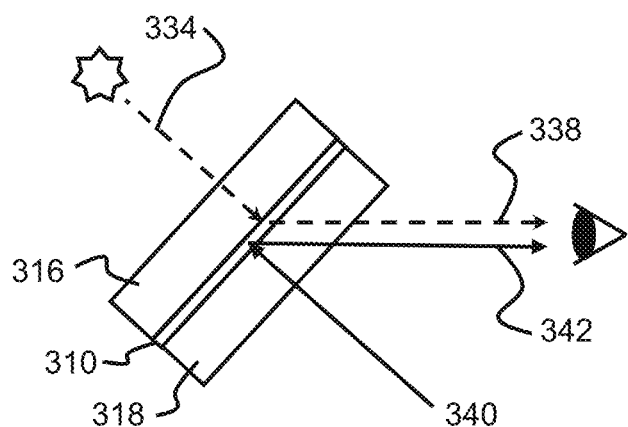
FIG. 6B is a side view of the prior art reflection hologram of FIG. 6A in which sunlight is diffracted from surface gratings of the transmission hologram as glare.

External illumination such as sunlight 334 causes playback glare to diffract on the transmission hologram recorded in the holographic polymer layer 310, as depicted in FIG. 6B. The retrieved glare 338 is then directed towards the viewer's eyes, along with the desired live playback 342 generated by the projected image 340.

Figure 7A:
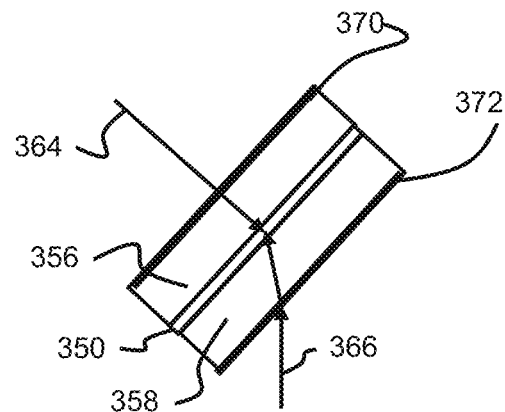
FIG. 7A is a side view of antireflective coatings disposed on opposite sides of a holographic substrate prior to recording a reflection hologram, resulting in no reflection from outer sides of glass substrates.
Figure 7B:
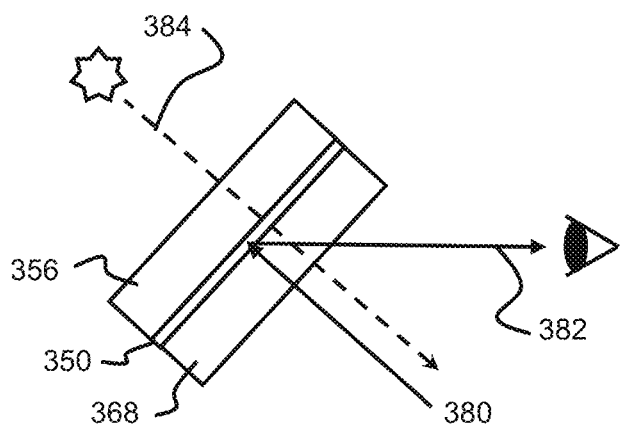
FIG. 7B is a side view of the reflection hologram of FIG. 7A in which the antireflective coatings of FIG. 7A inhibit the glare of FIG. 6B.

To eliminate glare caused by unwanted spurious transmission holograms, the transmission holograms should be prevented from being formed during the recording of HUD reflection hologram. One approach for achieving this is depicted in FIGS. 7A and 7B. A thin antireflective coated glass 370, 372 is index matched on each side of the proximal and distal glass layers 358, 356 with the holographic layer 350 in between, prior to recording the reflection hologram. For example, antireflective glass layers of 1-2 mm in thickness may be suitable. As the spurious transmission hologram has been suppressed during recording by the reference beam 364 and the object beam 366, as shown in FIG. 7A, there is no resulting glare caused by this transmission hologram during use and in the presence of external illumination such as sunlight, as shown in the demonstration of playback in FIG. 7B.

FIG. 7B shows the HUD holographic polymer layer 350, adjacent each of the proximal and distal glass layers 358, 356. The sunlight 384 does not cause glare in the viewer's eyes in the desired reflected image 382 generated by the projected image 380 because there is no spurious transmission hologram there.

In holographic polymers, some diffraction efficiency (DE) is present during recording due to the start of polymerization. A further approach to glare minimization is achieved as a result of the discovery here that DE during reflection hologram recording increases with recording beam exposure, whereas the DE during transmission hologram recording fluctuates with recording level.

Figure 8:
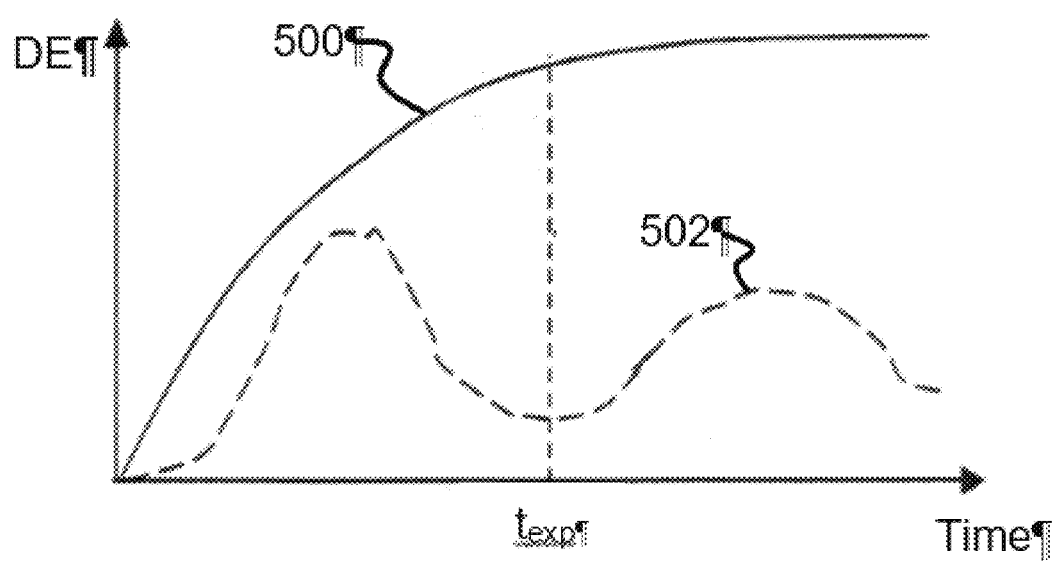
FIG. 8 is a side view of a holographic substrate in which a reflection hologram is being recorded while an inactive light beam characterizes the diffraction efficiencies of the desired reflection hologram and the undesired transmission hologram.

This divergence in DE for reflection hologram recording versus transmission hologram recording is illustrated in graphic form in FIG. 8. As exposure time increases along the X-axis to the right, reflection hologram DE 500 continues climbing in the Y-axis direction, then begins tapering off, but not receding.

In contrast, the DE for transmission hologram recording 502 has a sequence of local maxima and minima. If a minimum in transmission hologram DE can be detected after the reflection hologram DE has reached a desired threshold, then glare that might result from such a transmission hologram would be minimized.

By illuminating a holographic polymer layer during recording with an inactive light beam and suitable detectors, the varying degrees of DE for each of reflection and transmission holograms may be monitored and the recording process may be controlled to achieve a minimal degree of transmission hologram DE with an acceptable degree of reflection hologram DE. For example, by illuminating the hologram being recording with a near-infrared (NIR) laser beam at Bragg condition, the process of varying DEs during recording may be monitored and the exposure level that maximizes the reflection hologram DE while minimizing the transmission hologram DE may be achieved.

The ratio between the recording and playback Bragg angles θ and the wavelengths λ for thick holograms can be expressed as in Eq. (4):

$$\frac{\sin(\theta_R)}{\lambda_R} = (\sin(\theta_P))/\lambda_P \tag{4}$$

The recording Bragg angle is $\theta_R$, the playback Bragg angle is $\theta_P$, the recording wavelength is $\lambda_R$, and the playback wavelength is $\lambda_P$. From Eq. (4), one can see that the playback angles at NIR wavelength (for example, 900 nm) differ significantly from recording angles at visible light that are usually produced with blue, green or red laser beams.

Figure 9:
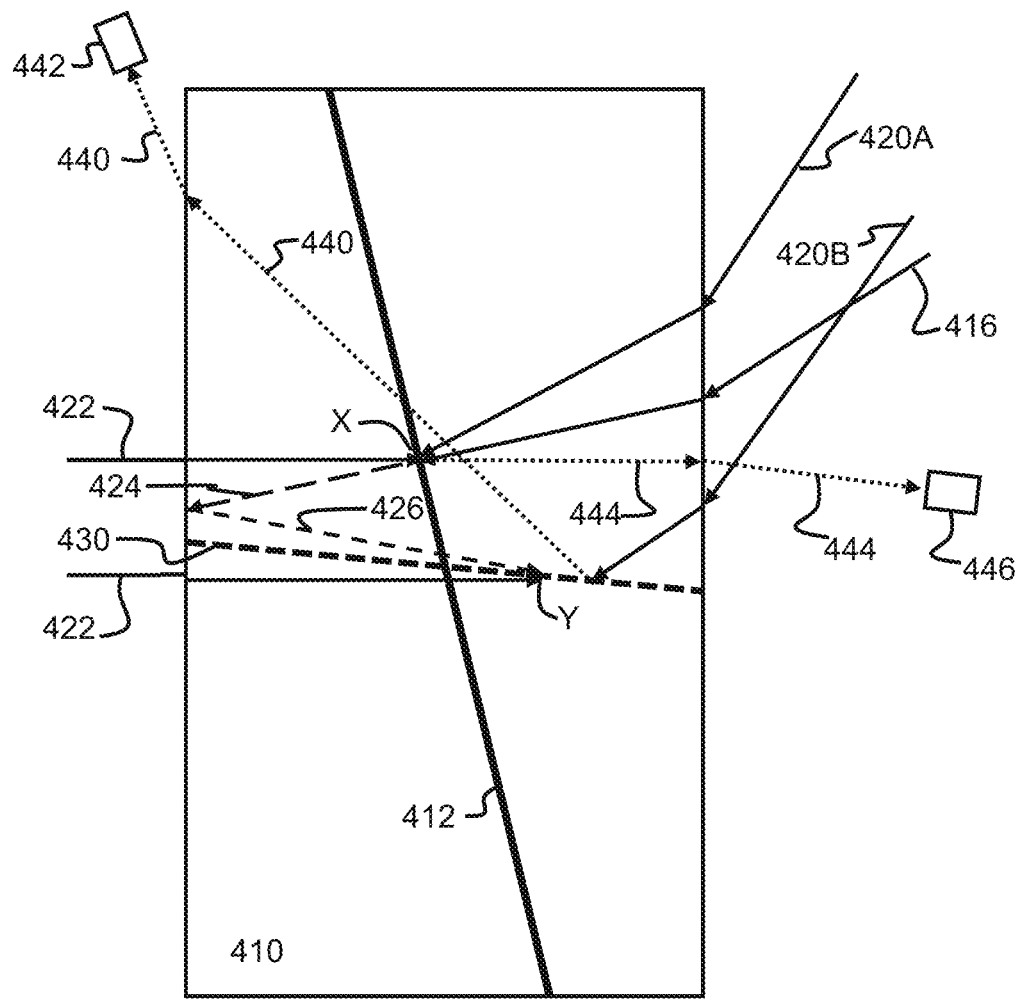
FIG. 9 is a plot of reflection hologram diffraction efficiency over time and transmission hologram diffraction efficiency over time, such as may be realized with the arrangement of FIG. 8.

A simplified ray propagation diagram for an integrated visible recording and NIR playback setup is provided in FIG. 9. The reflection hologram interference fringe plane 412 (only one fringe plane is shown) is being recorded with two visible spectrum laser beams 416, 422. A first of these beams is shown refracted through the right side of the holographic polymer layer 410. From among all the recording interferences fringe planes of the reflection HUD hologram, and for simplicity, only one recording main hologram fringe plane 412 is shown. This fringe plane is created with the two recording beams 416, 422. Point X in FIG. 9 is one of the points in the interference fringes where these recording beams meet, creating constructive interference. A portion 424 of the first recording beam 416 continues propagating through the polymer 410 creating the hologram and eventually reaches the left side of the holographic polymer layer. A partial Fresnel reflection 426 then interferes with a portion of the second recording beam 422 at point Y, contributing to the recording of one of the spurious transmission hologram fringe planes shown as dashed line 430.

Because polymerization can start in the holographic polymer during hologram exposure, if exposure time is significantly longer than 1 second, some DE is already present during exposure. This property of polymer holograms is exploited to test and monitor the recording process using an inactive NIR laser beam 420. A wide playback beam is employed in the embodiment of FIG. 9, though only two discrete rays 420A, 420B are illustrated.

The uppermost ray 420A is refracted in the recorded hologram 410 and diffracted on the recording main hologram fringe 412. A first photodetector 446 is used to measure the intensity of the NIR beam 444 diffracted from the reflection hologram fringe 412.

The lowermost ray 420B of the wide NIR playback beam 420 is diffracted on the fringes of the spurious transmission hologram 430. A second photodetector 442 is used to measure the intensity of the NIR beam 440 diffracted from the transmission hologram fringe 430. The outputs of the two photodetectors 446, 442, corresponding to the intensity of the two diffracted NIR beams 444, 440, are provided to a comparator circuit, such as a conventional operational amplifier, or op-amp, for comparison purposes.

Again, with reference to FIG. 8, at exposure time $t_{exp}$, the DE of the reflection hologram 500 is nearing its maximum while the DE of the transmission hologram 502 is approximately five times lower. By varying the intensity of the recording beams 416, 422, the difference between the two DEs may be increased to more than an order of magnitude, thereby effectively eliminating the unwanted spurious transmission hologram and achieving a HUD that is not susceptible to glare because of this spurious hologram. A minimum value for the DE of the reflection hologram may be defined to ensure the respective hologram is sufficient recorded.

Even though many reflections may be generated by the NIR beam 420 from the recording beam fringes, the Bragg condition can be achieved with only one incident beam angle. Thus, the probability of being confused as to the desired diffracted beam is low. Because it is possible that the diffracted NIR beams may be trapped within the holographic polymer layer 410 due to total internal reflection (TIR), it is important to perform a thorough analysis of the recording fringes, diffracted at Bragg angles, to assess possible conditions of TIR. The appropriate NIR laser wavelengths are then used to ensure the diffracted NIR beams are coupled out in air and measured by the photodetectors 446, 442.

While satisfactory results in glare minimization or prevention may be achieved using one of the foregoing approaches individually, even greater results may be obtained by combining the aspects of two, three, or all four of the foregoing approaches. While these approaches have been shown and described as standalone solutions, it is contemplated that multiple such solutions may be beneficially combined.

Alternative embodiments of the subject matter of this application will become apparent to one of ordinary skill in the art to which the present invention pertains, without departing from its spirit and scope. It is to be understood that no limitation with respect to specific embodiments shown here is intended or inferred.

Figure 10:
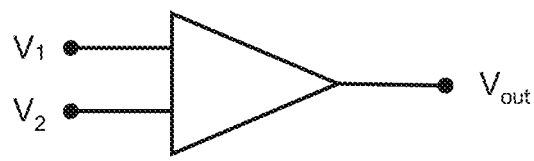
FIG. 10 is a schematic diagram of a comparator for analyzing the diffraction efficiencies of the reflection hologram versus transmission hologram during the recording of the reflection hologram according to FIG. 8.

FIG. 10 of the comparator module comprising a comparator, a data processor in communication with the comparator, a memory module in communication with the data processor, and a software product stored in the memory module. The data processor executes the software product to cause the data processor to compare the diffraction efficiencies of recorded useful reflection and spurious transmission holograms and stop the recording process at the maximal difference between those,

What is claimed is:

1. A system for reducing glare from a head-up display (HUD), comprising:
    (a) a distal glass layer;
    (b) a proximal glass layer;
    (c) a holographic polymer layer comprising a reflection hologram that is adjacent to the proximal glass layer; and
    (d) at least one compound substrate-guided hologram (SGH), comprised of a linear array of multiple, adjacent SGH segments, that is adjacent to the reflection hologram and adjacent to the distal glass layer;
    wherein radiation from an external light source could impinge upon a rearward surface of the reflection hologram, but through use of the SGH, is guided out to edge(s) of the hologram through total internal reflection (TIR) so that an image is not obscured by glare;
    wherein each of the multiple, adjacent SGH segments in the linear array is adjacent to the distal glass layer and is capable of accepting light from an external light source at a first location within the respective SGH segment and capable of transmitting the light into the distal glass layer by total internal reflection to a second location within the linear array without being diffracted.

2. The system of claim 1, wherein the distal glass layer acts as a transparent substrate along a length of a respective SGH segment.

3. The system of claim 1, wherein each SGH segment is configured to accept light from at least one of the external light source and to transmit the accepted light at a respective guided angle within the distal glass layer.

4. The system of claim 3, wherein the respective guided angle of the each SGH segment differs by the same value from the respective guided angle of the adjacent SGH segment or segments and is less than the guided angle of the adjacent SGH segment in a first direction.

5. The system of claim 3 wherein a minimum guided angle of an adjacent SGH segments is 12'; and wherein a maximum guided angle of the adjacent SGH segments is 48°.

6. The system of claim 1, wherein the length of each SGH segment is greater than the length of an adjacent SGH segment in a first direction.

7. The system of claim 3, wherein the guided angle of each SGH segment of each SGH segment differs from the guided angles of the remaining SGH segments.

8. The system of claim 1 wherein the light after bouncing once in the distal glass layer will not be in Bragg with an adjacent SGH segment.

9. The system of claim 1 wherein the linear array of multiple, adjacent SGH segments are oriented as plural, vertically adjacent, laterally oriented SGH segments.

10. The system of claim 1 wherein the multiple, adjacent SGH segments are multiplexed.

* * * * *